US012695298B2

(12) United States Patent　　(10) Patent No.: US 12,695,298 B2
Menold et al.　　(45) Date of Patent: Jul. 28, 2026

(54) MULTIPLE BUS BLEED-DOWN

(71) Applicant: Caterpillar Inc., Peoria, IL (US)

(72) Inventors: Rodney Lee Menold, Hanna City, IL (US); Jason Lee Miller, Princeville, IL (US); Matthew Lawrence Hendrickson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 255 days.

(21) Appl. No.: 18/732,071

(22) Filed: Jun. 3, 2024

(65) Prior Publication Data

US 2025/0373151 A1　　Dec. 4, 2025

(51) Int. Cl.
　H02J 1/082　　(2026.01)
　B60L 50/51　　(2019.01)
　H02M 3/158　　(2006.01)
　*H02M 1/36*　　(2007.01)

(52) U.S. Cl.
　CPC .............. H02J 1/082 (2020.01); B60L 50/51 (2019.02); H02M 3/158 (2013.01); *B60L 2210/10* (2013.01); *H02M 1/36* (2013.01)

(58) Field of Classification Search
　CPC .. B60L 2210/12; B60L 3/0023; B60L 3/0092; E02F 9/2091; H02J 2105/37; H02J 1/082
　See application file for complete search history.

(56) References Cited

U.S. PATENT DOCUMENTS

| | | |
|---|---|---|
| 6,304,059 B1 | 10/2001 | Chalasani et al. |
| 8,610,382 B2 * | 12/2013 | Goldammer .......... B60W 50/04 |
| | | 318/140 |
| 10,536,999 B2 * | 1/2020 | Chen .................. H05B 45/3725 |
| 2009/0033148 A1 | 2/2009 | Hoff et al. |
| 2012/0161679 A1 | 6/2012 | Goldammer et al. |
| 2015/0002095 A1 | 1/2015 | Wada et al. |
| 2015/0295421 A1 | 10/2015 | Blakemore et al. |
| 2016/0082858 A1 | 3/2016 | Yang et al. |
| 2016/0096437 A1 | 4/2016 | Tripathi et al. |
| 2018/0029479 A1 | 2/2018 | Wang et al. |
| 2020/0079354 A1 | 3/2020 | Damsaz et al. |
| 2024/0149717 A1 | 5/2024 | Hendrickson et al. |

FOREIGN PATENT DOCUMENTS

| | | |
|---|---|---|
| CN | 114248626 A | 3/2022 |
| CN | 210309975 U | 4/2024 |
| JP | 2004147477 A | 5/2004 |
| WO | 2018012028 A1 | 1/2018 |

OTHER PUBLICATIONS

Written Opinion and International Search Report for Int'l. Patent Appln. No. PCT/US2025/030488, mailed Sep. 29, 2025 (42 pgs).

* cited by examiner

*Primary Examiner* — Kyle J Moody

(74) *Attorney, Agent, or Firm* — Harrity & Harrity LLP

(57)　　　ABSTRACT

In some implementations, a supervisory electronic control unit (ECU) may output, to a first controller, a first control signal commanding the first controller to provide a first voltage to a first bus during a bleed-down operation. The supervisory ECU may output, to a second controller, a second control signal commanding the second controller to provide a second voltage to a second bus during the bleed-down operation. The supervisory ECU may activate, during the bleed-down operation, a sinking device electrically connected to the first bus and the second bus.

20 Claims, 3 Drawing Sheets

100

MULTIPLE BUS BLEED-DOWN

TECHNICAL FIELD

The present disclosure relates generally to a machine with multiple power buses and, for example, to performing a bleed-down operation on the multiple power buses using a single sinking device.

BACKGROUND

In battery electric machinery with multiple high-voltage power buses, a bleed-down operation can systematically reduce stored energy. The bleed-down operation may be controlled by a supervisory electronic control unit (ECU) that monitors voltage and current, and activates components like motors or resistive loads to dissipate electrical energy. When the battery electric machinery needs to undergo maintenance, have diagnostics performed, or undergo an emergency shutdown, the bleed-down operation can bring the voltages of the high-voltage power buses to levels that are less likely to result in electrical hazards. The bleed-down operation involves activating multiple sinking devices, each sinking device electrically connected to one of the power buses to reduce the voltage on the respective power bus.

U.S. Pat. No. 10,160,332 (the '332 patent) discloses a topology for electric power distribution in a vehicle that includes a high-voltage bus connected to a DC-DC electric power converter that is connected to a low-voltage DC load. A controller receives a command to discharge the high-voltage electric power bus, and in response, controls a first gate circuit to operate a first switch in a linear mode, and controls a second gate circuit to operate a second switch in a pulsewidth-modulated mode. A duty cycle for the pulsewidth-modulated operation of the second switch is determined based upon the magnitude of electric current. A first high-voltage electric power discharge path is indicated, and passes through the DC-AC inverter module to the electric machine. A second high-voltage electric power discharge path is indicated, and passes through the DC-DC electric power converter to the low-voltage DC power source.

The control system of the present disclosure solves one or more problems in the art.

SUMMARY

A supervisory electronic control unit (ECU) may include one or more memories, and one or more processors, communicatively coupled to the one or more memories, configured to: output, to a first controller, a first control signal commanding the first controller to provide a first voltage to a first bus during a bleed-down operation; output, to a second controller, a second control signal commanding the second controller to provide a second voltage to a second bus during the bleed-down operation; and activate, during the bleed-down operation, a sinking device electrically connected to the first bus and the second bus.

A machine may include a sinking device configured to be electrically connected to a first bus and a second bus during a bleed-down operation; a first direct current (DC)-to-DC (DC/DC) converter configured to energize the first bus with a first voltage; a second DC/DC converter configured to energize the second bus with a second voltage; and a supervisory ECU configured to: detect a bleed-down condition; and perform the bleed-down operation by activating the sinking device, outputting a first control signal to the first DC/DC converter, and outputting a second control signal to the second DC/DC converter as a result of detecting the bleed-down condition.

A method may include outputting, to a first controller, a first control signal commanding the first controller to provide a first voltage to a first bus during a bleed-down operation; outputting, to a second controller, a second control signal commanding the second controller to provide a second voltage to a second bus during the bleed-down operation; and activating, during the bleed-down operation, a sinking device electrically connected to the first bus and the second bus.

DETAILED DESCRIPTION

This disclosure relates to a system for performing a bleed-down operation using a single sinking device, which is applicable to any work machine that has multiple high-voltage power buses. For example, the work machine may be a vehicle, a compactor machine, a paving machine, a cold planer, a grading machine, a backhoe loader, a wheel loader, a harvester, an excavator, a motor grader, a skid steer loader, a tractor, a dozer, a locomotive vehicle, or the like. The work machine may be used for construction, agriculture, or mining, among other examples.

Figure 1:
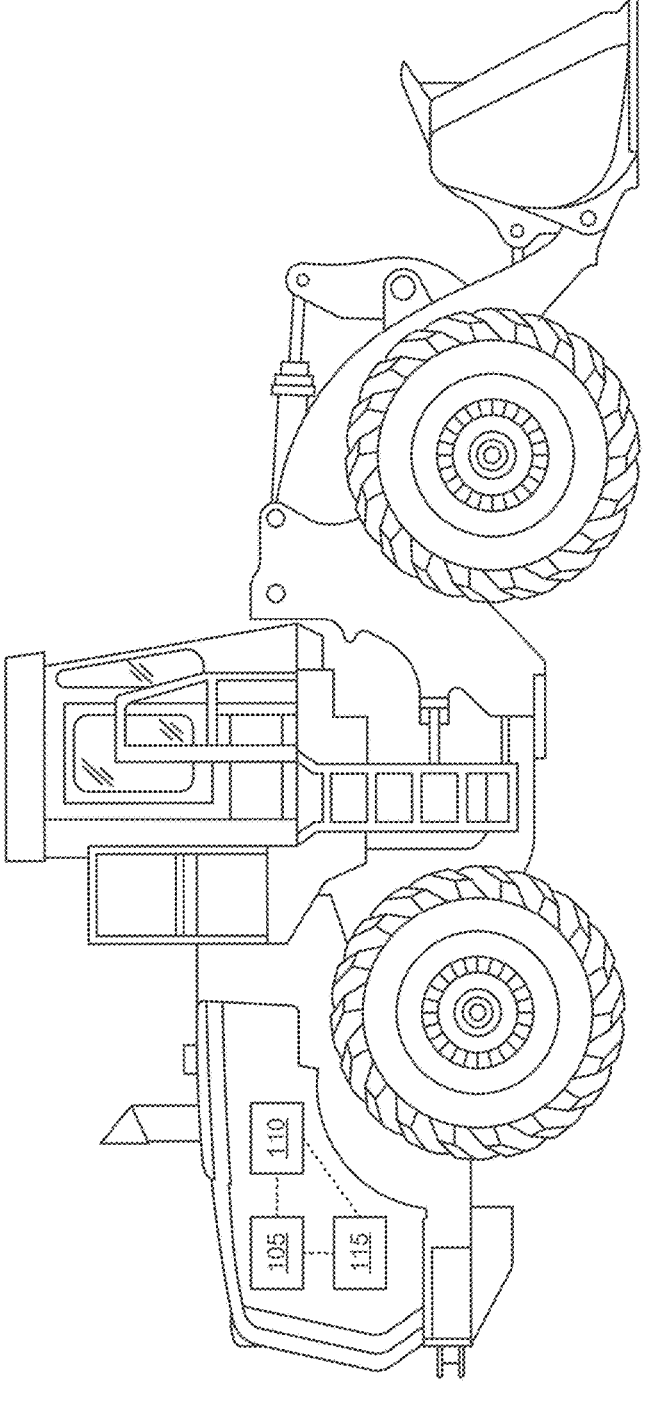
FIG. 1 is a diagram of an example work machine that includes a high-voltage circuit, a supervisory ECU, and one or more electronic components.

FIG. 1 is a diagram of an example work machine 100 that includes a high-voltage circuit 105, a supervisory electronic control unit (ECU) 110, and one or more electronic components 115. These devices are described in more detail below in connection with FIG. 2.

The high-voltage circuit 105 includes multiple high-voltage power buses (see FIG. 2) that provide voltage to the electronic components of the work machine 100. The high-voltage circuit may be powered by a power source such as a high-voltage battery. Each power bus of the high-voltage circuit may carry a different voltage, and each of the electronic components 115 of the work machine 100 may be electrically connected to the power bus that provides the appropriate voltage for that electronic component. As discussed in greater detail below with respect to FIG. 2, the high-voltage circuit 105 may include multiple controllers, multiple DC/DC converters, among other components.

The supervisory ECU 110 may include any number of chips, controllers, processors, memories, and/or a combination thereof, among other examples, for controlling certain operations of the high-voltage circuit 105. The supervisory ECU 110 may be configured to output control signals to one or more components of the high-voltage circuit 105, output device control signals to one or more of the electronic components 115, and/or a combination thereof, among other examples. For example, the supervisory ECU 110 may be configured to perform a bleed-down operation on the multiple high-voltage power buses. During the bleed-down operation, the supervisory ECU 110 may be configured to activate one of the electronic components 115 and output control signals that energize the multiple power buses such that the electronic component 115 may drain the voltage of the power buses.

The electronic components 115 may include any battery-powered component that may be used during operation of the work machine 100. Examples of electronic components may include an electric motor, a fan, a pump, a heater, a battery chiller, and/or a combination thereof, among other examples. As discussed in greater detail below with respect to FIG. 2, one of the electronic components 115 may serve as a sinking device for the high-voltage power buses of the high-voltage circuit 105. For example, one of the electronic components 115 may be activated during the bleed-down operation to simultaneously drain the voltage of multiple high-voltage power buses.

As indicated above, FIG. 1 is provided as an example. Other examples may differ from what is described with regard to FIG. 1.

Figure 2:
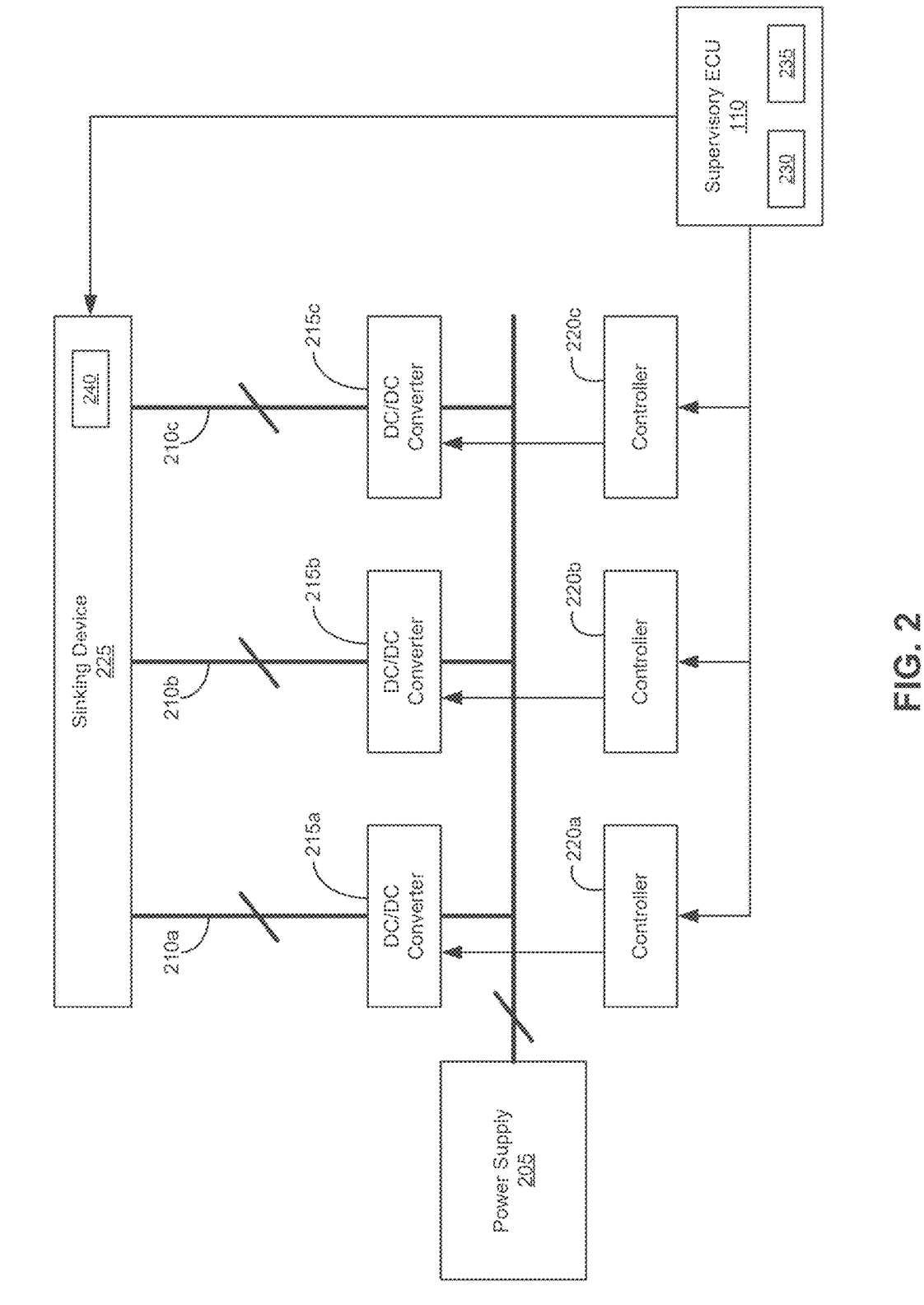
FIG. 2 is a diagram of an example control system associated with multiple power bus bleed-down using a single sinking device.

FIG. 2 is a diagram of an example control system 200 associated with multiple power bus bleed-down using a single sinking device. As shown in FIG. 2, the control system 200 includes a power supply 205, multiple high-voltage power buses 210, multiple DC/DC converters 215, multiple controllers 220, the supervisory ECU 110, and a sinking device 225.

The power supply 205 may include a battery, fuel cell, or other energy source capable of providing high-voltage DC energy to the components of the machine 100. The output of the power supply 205 may be provided to one or more of the DC/DC converters 215, which may be configured to reduce the voltage output of the power supply 205 to a voltage for one of the power buses 210. For example, the power supply 205 may be configured to output a maximum system voltage to each of the DC/DC converters 215. A first DC/DC converter 215a may be configured to reduce the maximum system voltage to a first voltage for use on a first bus 210a. A second DC/DC converter 215b may be configured to reduce the maximum system voltage to a second voltage for use on a second bus 210b. A third DC/DC converter 215c may be configured to reduce the maximum system voltage to a third voltage for use on a third bus 210c. The first voltage, the second voltage, and the third voltage may be different from one another. For example, the first voltage may be 1500 volts, the second voltage may be 1270 volts, and the third voltage may be 2600 volts.

Each DC/DC converter 215 may be controlled by a controller 220, which may include one or more electronic components configured to receive control signals from the supervisory ECU 110 and output control signals to the respective DC/DC converters 215. The control signals output by the controllers 220 to their respective DC/DC converters 215 may cause each of the DC/DC converters 215 to energize one of the high-voltage power buses 210. For example, a first controller 220a may be configured to output control signals that cause the first DC/DC converter 215a to energize the first power bus 210a, a second controller 220b may be configured to output control signals that cause the second DC/DC converter 215b to energize the second power bus 210b, and a third controller 220c may be configured to output control signals that cause the third DC/DC converter 215c to energize the third power bus 210c.

The sinking device 225 may be electrically connected to each of the high-power buses 210, at least during a bleed-down operation. For example, the sinking device 225 may be configured to activate or be activated, during the bleed-down operation, in response to a device control signal output by the supervisory ECU 110. The activation of the sinking device 225 may cause the sinking device to draw electrical energy from each of the power buses 210 until each of the power buses 210 is drained of energy (e.g., the voltage of each power bus 210 drops to a lower voltage such as zero volts). Operations of the sinking device 225 may be controlled by a device controller 240. For example, if the sinking device 225 is an electric motor, the device controller 240 may be configured to control the operation of the electric motor in accordance with one or more device control signals output by the supervisory ECU 110.

The supervisory ECU 110 may include any number of electronic components including one or more memories 230 and one or more processors 235 communicatively coupled to the memories 230. The memories 230 may be configured to electronically store instructions executable by the processors 235. The instructions stored in the memories 230 may include instructions associated with the operation of the supervisory ECU 110. For example, the instructions may include instructions for outputting control signals to cause the DC/DC converters 215 to energize the power buses 210, outputting control signals that activate the sinking device 225 during a bleed-down operation, and/or a combination thereof, among other examples.

The instructions stored in the memories 230 and executable by the processor 235 may further include instructions for detecting a bleed-down condition and performing the bleed-down operation. For example, the bleed-down condition may be associated with a shut-down operation (e.g., the work machine 100 is entering or operating in a shut-down mode). The processors 235 may be configured to detect the bleed-down condition as a result of the occurrence of the shut-down operation. Further, as a result of detecting the bleed-down condition, the processor 235 may be configured to initiate the bleed-down operation. As part of the bleed-down operation, the processor 235 may be configured to activate the sinking device 225 (via, e.g., a device control signal output to the device controller 240), output a first control signal to the first DC/DC converter 215a to energize the first bus 210a with a first voltage, output a second control signal to the second DC/DC converter 215b to energize the second bus 210b with a second voltage, and output a third control signal to the third DC/DC converter 215c to energize the third bus 210c with a third voltage. The first control signal, the second control signal, and the third control signal may be output by the supervisory ECU 110 contemporaneously so that each of the first bus 210, the second bus 210b, and the third bus 210c are energized during an overlapping period of time, which may allow the sinking device 225 to simultaneously drain the voltages of first bus 210a, the second bus 210b, and the third bus 210c.

As indicated above, FIG. 2 is provided as an example. Other examples may differ from what is described with regard to FIG. 2.

Figure 3:
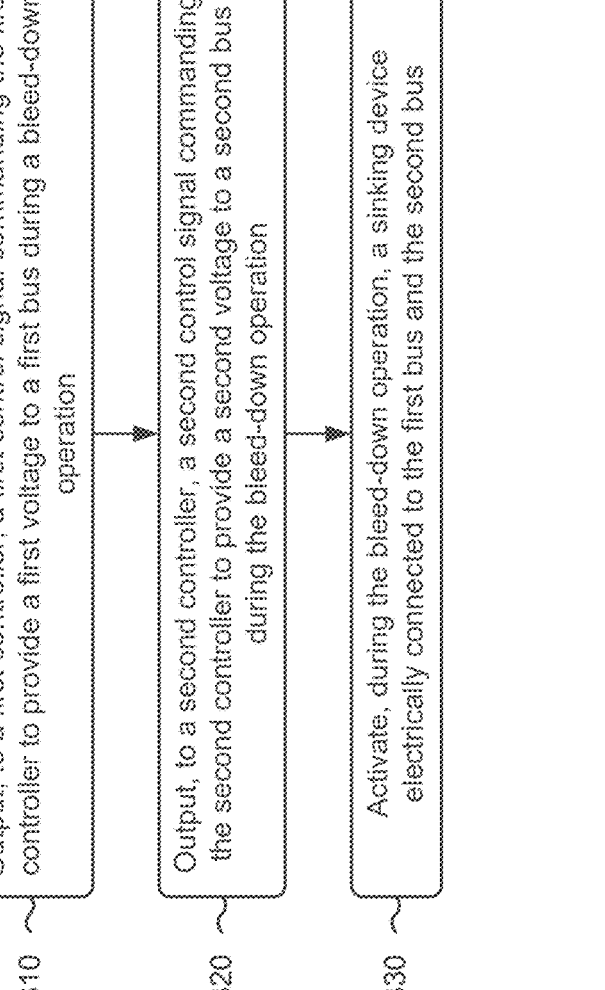
FIG. 3 is a flowchart of an example process associated with a bleed-down operation for multiple power buses using a single sinking device.

FIG. 3 is a flowchart of an example process 300 associated with a bleed-down operation for multiple power buses using a single sinking device. One or more process blocks of FIG. 3 may be performed by a supervisory ECU (e.g., supervisory ECU 110). Additionally, or alternatively, one or more process blocks of FIG. 3 may be performed by another device or a group of devices separate from or including the supervisory ECU, such as another device or component that is internal or external to the machine 100 and/or the control system 200.

As shown in FIG. 3, process 300 may include outputting, to a first controller (e.g., the first controller 220a), a first control signal commanding the first controller to provide a first voltage to a first bus (e.g., the first bus 210a) during a bleed-down operation (block 310). For example, the supervisory ECU may output, to a first controller, a first control signal commanding the first controller to provide a first voltage to a first bus during a bleed-down operation, as described above.

As further shown in FIG. 3, process 300 may include outputting, to a second controller (e.g., the second controller 220*b*), a second control signal commanding the second controller to provide a second voltage to a second bus (e.g., the second bus 210*b*) during the bleed-down operation (block 320). For example, the supervisory ECU may output, to a second controller, a second control signal commanding the second controller to provide a second voltage to a second bus during the bleed-down operation, as described above.

The first control signal and the second control signal may be output as a result of detecting a bleed-down condition. The bleed-down condition may be associated with a shut-down operation. The first control signal and the second control signal may output contemporaneously so that the first bus and the second bus are energized during an overlapping period of time.

As discussed above, the first controller may control operation of a first DC/DC converter (e.g., the first DC/DC converter 215*a*) associated with the first bus and the second controller may control operation of a second DC/DC converter (e.g., the second DC/DC converter 215*b*) associated with the second bus.

As further shown in FIG. 3, process 300 may include activating, during the bleed-down operation, a sinking device (e.g., the sinking device 225) electrically connected to the first bus and the second bus (block 330). For example, the supervisory ECU may activate, during the bleed-down operation, a sinking device electrically connected to the first bus and the second bus, as described above. The sinking device may be one of an electric motor, a fan, a pump, a heater, or a battery chiller.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

In a battery electric machine with multiple high-voltage power buses, a bleed-down operation can systematically reduce stored energy, which can reduce electrical hazards associated with high-voltage systems, particularly when the battery electric machine needs to undergo maintenance, have diagnostics performed, or undergo an emergency shut-down. Different power buses may have different voltage levels to power different electronic components. Having to activate multiple components as part of the bleed-down operation can increase the amount of time needed to dissipate the voltage of each of the power buses as well as the cost of operating and/or maintaining the battery electric machine.

Rather than activate multiple components on different power buses, the supervisory ECU of the control system described above activates a single sinking device that can simultaneously drain the voltages of multiple power buses. As a result, the bleed-down operation may be performed more quickly than if different sinking devices are used to drain the voltage of respective power buses. Moreover, activating a single sinking device to drain multiple power buses could extend the operating life of other components of the battery electric vehicle that would have been used to drain the voltage of one of the power buses.

What is claimed is:

1. A supervisory electronic control unit (ECU), comprising:
   one or more memories; and
   one or more processors, communicatively coupled to the one or more memories, configured to:
      output, to a first controller, a first control signal commanding the first controller to provide a first voltage to a first bus during a bleed-down operation;
      output, to a second controller, a second control signal commanding the second controller to provide a second voltage to a second bus during the bleed-down operation; and
   activate, during the bleed-down operation, a sinking device electrically connected to the first bus and the second bus.

2. The supervisory ECU of claim 1, wherein the one or more processors are configured to detect a bleed-down condition.

3. The supervisory ECU of claim 2, wherein the one or more processors are configured to output the first control signal and the second control signal during the bleed-down operation as a result of detecting the bleed-down condition.

4. The supervisory ECU of claim 2, wherein the one or more processors are configured to activate the sinking device as a result of detecting the bleed-down condition.

5. A machine, comprising:
   a sinking device configured to be electrically connected to a first bus and a second bus during a bleed-down operation;
   a first direct current (DC)-to-DC (DC/DC) converter configured to energize the first bus with a first voltage;
   a second DC/DC converter configured to energize the second bus with a second voltage; and
   a supervisory electronic control unit (ECU) configured to:
      detect a bleed-down condition; and
      perform the bleed-down operation by activating the sinking device, outputting a first control signal to the first DC/DC converter, and outputting a second control signal to the second DC/DC converter as a result of detecting the bleed-down condition.

6. The machine of claim 5, further comprising a third DC/DC converter configured to energize a third bus with a third voltage,
   wherein the sinking device is electrically connected to the third bus.

7. The machine of claim 5, wherein the supervisory ECU is configured to output the first control signal and the second control signal contemporaneously during the bleed-down operation.

8. The machine of claim 5, wherein the sinking device includes a device controller, and wherein, to activate the sinking device, the supervisory ECU is configured to output a device control signal to the device controller of the sinking device.

9. The machine of claim 5, wherein the sinking device is one of an electric motor, a fan, a pump, a heater, or a battery chiller.

10. The machine of claim 5, wherein the first DC/DC converter includes a first controller.

11. The machine of claim 10, wherein the supervisory ECU is configured to output the first control signal to the first controller.

12. The machine of claim 10, wherein the second DC/DC converter includes a second controller.

13. The machine of claim 12, wherein the supervisory ECU is configured to output the second control signal to the second controller.

14. The machine of claim 5, wherein the sinking device is configured to, when activated by the supervisory ECU, drain the first voltage of the first bus and the second voltage of the second bus during the bleed-down operation.

15. A method, comprising:

outputting, to a first controller, a first control signal commanding the first controller to provide a first voltage to a first bus during a bleed-down operation;

outputting, to a second controller, a second control signal commanding the second controller to provide a second voltage to a second bus during the bleed-down operation; and activating, during the bleed-down operation, a sinking device electrically connected to the first bus and the second bus.

16. The method of claim 15, wherein the first control signal and the second control signal are output as a result of detecting a bleed-down condition.

17. The method of claim 16, wherein the bleed-down condition is associated with a shutdown operation.

18. The method of claim 15, wherein the first control signal and the second control signal are output contemporaneously.

19. The method of claim 15, wherein the sinking device is one of an electric motor, a fan, a pump, a heater, or a battery chiller.

20. The method of claim 15, wherein the first controller is configured to control operation of a first direct current (DC)-to-DC (DC/DC) converter associated with the first bus and the second controller is configured to control operation of a second DC/DC converter associated with the second bus.

* * * * *